United States Patent [19]

Lorenz et al.

[11] Patent Number: 5,066,435
[45] Date of Patent: Nov. 19, 1991

[54] PROCESS AND SYSTEM FOR PRODUCING MULTI-LAYER EXTRUDATE

[75] Inventors: Hans Lorenz, Darmstadt; Heinz Gross, Rossdorf; Roland Schuchmann, Ober-Ramstadt; Helmut Häring, Reinheim, all of Fed. Rep. of Germany

[73] Assignee: Rohm GmbH Chemische Fabrik, Darmstadt, Fed. Rep. of Germany

[21] Appl. No.: 488,131

[22] Filed: Mar. 5, 1990

[30] Foreign Application Priority Data

Sep. 16, 1989 [DE] Fed. Rep. of Germany ... 8911084[U]

[51] Int. Cl.$^5$ ............................................. B69C 47/92
[52] U.S. Cl. ................................. 264/40.5; 264/40.7; 264/171; 264/211.12; 425/131.1; 425/141; 425/382.4; 425/462; 425/465
[58] Field of Search ............... 264/40.5, 40.2, 40.7, 264/40.1, 171, 211.12; 425/131.1, 133.5, 466, 465, 462, 382.4, 381, 461, 141

[56] References Cited

U.S. PATENT DOCUMENTS

| | | | |
|---|---|---|---|
| 3,830,610 | 8/1974 | Ohkawa et al. | 425/141 |
| 3,877,857 | 4/1975 | McLead | 425/381 |
| 4,329,133 | 5/1982 | Gallizia | 425/382.4 |
| 4,439,125 | 3/1984 | Dieckmann et al. | 425/140 |
| 4,443,397 | 4/1984 | Hahn et al. | 264/40.7 |
| 4,470,790 | 9/1984 | Harada et al. | 425/466 |
| 4,476,075 | 10/1984 | Brinkmann et al. | 264/40.7 |
| 4,514,812 | 4/1985 | Miller et al. | 425/141 |
| 4,562,023 | 12/1985 | Pabst et al. | 425/131.1 |
| 4,676,936 | 6/1987 | Wallace et al. | 264/40.1 |
| 4,695,236 | 9/1987 | Predohl et al. | 425/133.5 |

FOREIGN PATENT DOCUMENTS

| | | |
|---|---|---|
| 3315184 | 6/1984 | Fed. Rep. of Germany . |
| 3405257 | 8/1985 | Fed. Rep. of Germany . |
| 3741793 | 7/1989 | Fed. Rep. of Germany . |

OTHER PUBLICATIONS

Antec '88, pp. 165-167, S. Shapiro: "On-Line Layer Discrimination of Multi-Layer Structures", 4-1988.

Primary Examiner—Jeffery Thurlow
Attorney, Agent, or Firm—Oblon, Spivak, McClelland, Maier & Neustadt

[57] ABSTRACT

For producing a multi-extrudate of thermoplastically processable plastic, a coextrusion adapter block has a multi-part slide having a plurality of side-by-side slide sections mutually spaced in a direction transverse to the flow direction and slidably fitted in the adapter block for movement to adjustably protrude into a secondary runner for adjusting the thickness of a molten extrudate therein. A multi-layer extrudate emerging from the adapter block is further extruded in an extrusion die, and the thickness of at least one layer thereof is measured at a plurality of positions along the width thereof. The width measurements are used to control the positions of corresponding slide sections so that the layer thicknesses can be accurately controlled during an extruding operation.

10 Claims, 3 Drawing Sheets

PROCESS AND SYSTEM FOR PRODUCING MULTI-LAYER EXTRUDATE

BACKGROUND OF THE INVENTION

1. Field of the Invention

The invention relates to a system having a coextrusion adapter for the production of coextruded webs or extrudates from two or more plastics that can be processed thermoplastically. The coextrusion adapter brings together the streams of molding compounds being conveyed from two or more extruders into one common extrudate with two or more layers and conveys this extrudate into a slit die in which it is stretched to the desired width and correspondingly reduced in thickness. The average thickness of the layers involved thus decreases in the same proportion as the total thickness.

2. Background of the Related Art

There is known from DE-A 35 05 257 a coextrusion adapter designated as a collector block and forming unit. In this coextrusion adapter a thicker main extrudate and a thinner secondary extrudate are brought together. The combined extrudates are subsequently extruded via a slit die to form a multilayered slab or sheet which contains a covering layer of the material from the secondary extrudate.

As a rule the covering layer is not completely uniformly distributed over the width of the extruded web. This can have a series of causes, for example unevenness in the cross-section forms of the main and secondary extrudate, uneven temperatures within the main extrudate or the secondary extrudate from which varying melting viscosities and a correspondingly varying flow behavior follow, or varying flow resistances of the molding compound extrudates within the coextrusion adapter or the extrusion die. It is difficult to identify the causes of the uneven distribution of thickness, and even more difficult to eliminate them.

According to DE-A 34 05 257 the thickness and the uniformity of the coextruded layer are controlled by regulating the thickness profile of the secondary extrudate in the coextrusion adapter by separate control means. For this purpose a slide that can be adjusted by adjusting screws is used which protrudes more or less deeply into the secondary runner in which the secondary extrudate flows in the direction of the juncture of both extrudates. By operating the adjusting screws that act on the slide, the flow resistance in the secondary extrudate can be influenced, and thus also its thickness in relation to the main extrudate.

Such adjustment is however not suitable for evening out unevennesses in the distribution of the layer thicknesses over the width of the extruded web, for example if the covering layer in the middle is thicker or thinner than that on the edges or has some other nonlinear profile. In this case a slide is used in the coextrusion adapter, whose profile is configured opposite to the profile of the covering layer; i.e., the slide protrudes deeper into the melt flow as the profile of the covering layer of the extruded web becomes thicker, and vice versa. The slide profile can only be adapted empirically to the unevenness of the covering layer profile, because it is not possible to assign a specific point of the slide profile to a specific area of the covering layer profile. Furthermore, it cannot be predicted how sharply the slide profile must be changed to effectively even out an unevenness in the covering layer profile detected in a crosswise direction.

To adapt the slide profile, the extrusion must be repeatedly interrupted, the coextrusion adapter cooled and opened, the slide taken out and mechanically reworked and reinstalled, and the extrusion started up again. If the change made proves to be insufficient, the adaptation process must be repeated until the necessary uniformity of the covering layer profile is achieved. Even then a further adaptation can become necessary if after prolonged operation the flow conditions in the extrusion unit have changed and new unevennesses in the covering layer occur.

To simplify the adaptation of the slide, R. Reitemeyer ("Kunststoffe" [Plastics] Volume 78, 1988, No 5, pages 395-397) proposed configuring the coextrusion adapter so that the slide can be pushed in laterally like a cassette into a corresponding guide. In this way a complete dismantling of the adapter at every adaptation step is avoided, but not the interruption of the coextrusion. Further, he proposed making the slide in several parts, thus to apparently be able to combine the sections that protrude at varying depths into the melt flow.

In an extrusion device according to DE-A 37 41 793 this configuration was further developed in that the sections of the multipart slide protruding in the crosswise direction next to one another into the secondary runner are placed so that they can be shifted in the adjustment direction while pressed against one another and are adjustable by separate control means. The adjustment of each of the sections is sensed by a measuring device and the measurement is used to influence the control means. For this purpose piezotranslators can be used. The recorded values, relative to the special plastic web which is being produced at the time, can be fed to a computer and incorporated into a program.

Thus it is certainly possible to adjust the extrusion unit quickly and largely automatically to different, previously determined extrusion conditions. On the other hand, the known device does not make it possible to adapt the extrusion device automatically to changing extrusion conditions during operation. Such changes can occur from multiple causes: for example because of temperature fluctuations which can result from movements of air in the surroundings of the extrusion unit, from changes in the melt viscosity as a result of a slightly different nature of the plastic that is fed in, or from changes in the flow resistance of the melt flow as a result of wear or corrosion in the flow paths. In such cases the melt flow in the coextrusion adapter can be adapted to the changed conditions by acting on the control elements, or the adjustment program can be correspondingly changed. However, such an adjustment presupposes conscious interventions by the operating personnel, which can take place only with considerable hesitation.

SUMMARY OF THE INVENTION

An object of the invention is to make available a coextrusion adapter with an adjustable slide, which can be adjusted without dismantling during the extrusion operation, depending on the unevenness of the extruded cover layer profile occurring in each case.

The above, and other, objects are achieved according to the present invention by a system for producing a multi-layer extrudate of thermoplastically processible plastic, comprising an extrusion adapter block having a main runner through which an extrudate may flow in a flow direction and at least one secondary runner connected to the main runner and through which another extrudate may flow for merger with the extrudate in the main runner to form a multi-layer extrudate. Means are provided in the adapter block for regulating the thickness of an extrudate flowing through each of the secondary runners, comprising a multi-part slide comprising a plurality of side-by-side slide sections mutually spaced in a direction transverse to the flow direction and slidably fitted in the adapter block for movement to adjustably protrude into the secondary runner. Control means are provided for separately controlling movement of at least some of the slide sections, the control means comprising at least two independently moveable control elements connected to the slide sections. A die is provided through which the multi-layer extrudate is extruded, and measuring means are provided for selectably measuring the thickness of individual layers of the extruded multi-layer extrudate at a plurality of places distributed over the width thereof, as well as means for driving the control elements as a function of the thicknesses measured by the measuring means. The thicknesses of the layers of extruded multi-layer extrudate can thus be controlled during the running operation of the system.

According to another feature of the invention, there is provided a process for producing a multi-layer extrudate of thermoplastically processable plastic, comprising the steps of feeding at least two melted thermoformable plastic extrudates to respective runners of an extrusion adaptor where the extrudates are merged to form a multi-layer extrudate, extruding the multi-layer extrudate through a die to form an extruded multi-layer extrudate, and sensing a thickness of at least one layer of the extruded multi-layer extrudate at a plurality of positions along the width of the extruded multi-layer extrudate during the extruding step. At least one multipart slide is provided in the extrusion adapter, the multipart slide comprising a plurality of side-by-side slide sections mutually spaced along the width of the extrusion adapter and slidably fitted in the extrusion adapter for movement to adjustably protrude into a respective one of the runners for adjusting the thickness of the extrudate in the respective one of the runners. The positions of the slide sections are controlled during the extruding step as a function of the sensed thickness of the layer at width positions corresponding to width positions of the slide sections.

While the known coextrusion adapter was adjusted in each case by separate adjustment of the sections of the multipart slide to a specific, predetermined point of operation, with the device according to the invention it is possible for the first time to readjust the coextrusion adapter during the running operation according to the characteristics of the extruded web. In particular, it is possible to carry out such an adjustment automatically. The more finely the slide is subdivided, the more precisely a narrowly limited area in which a deviation from the set value of the layer thickness occurs can be readjusted. For this reason, it is advantageous that the multipart slide consists of more than three sections, and that none of the sections of the multipart slide represents more than half of the total width of the web. Instead the sections should be of about equal width.

Thus, during extrusion according to the invention, sections of the slide can be adjusted independently from one another by separate control elements, without the extrusion having to be interrupted and the coextrusion adapter dismantled.

To adapt the coextrusion adapter to a specific extrusion die the effect of the adjustment of one individual control element on the extrudate in a running operation is measured. Thus a certain width range of the extruded web is assigned to each control element and at the same time the extent of the adjustment is related to the change in the layer thickness that has been caused. Accordingly an exact adjustment variable for a given control element can be assigned to each measured deviation in thickness from the set value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
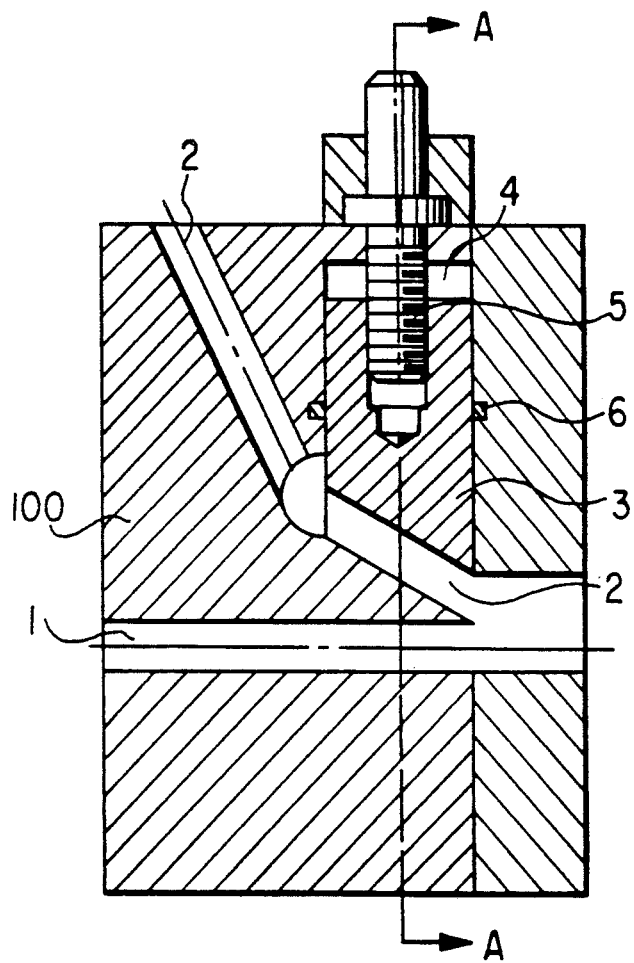
FIG. 1 is a longitudinal section through an embodiment the coextrusion adapter of the invention along a plane extending in the direction of extrusion.
Figure 2:
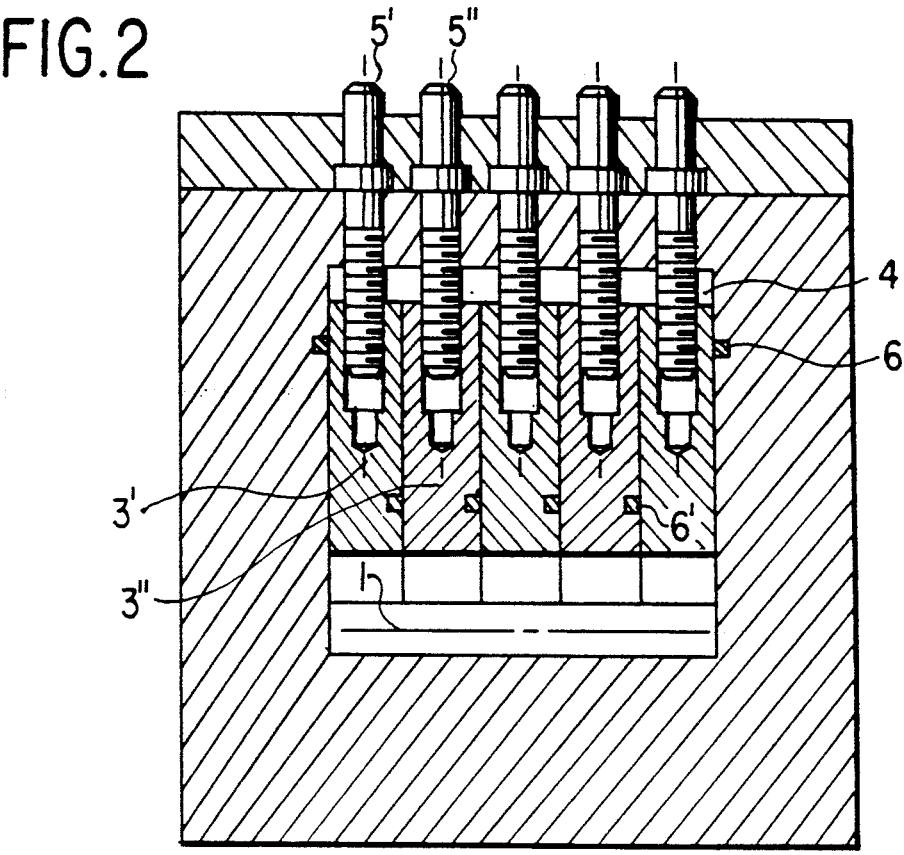
FIG. 2 is a cross section along line A—A in FIG. 1 with the control elements in their lowermost position.

In FIG. 1, 1 designates the main runner and 2 the secondary runner in an adapter block 100 in a coextrusion adapter. Slide 3 is placed in guide 4 so that it can be vertically shifted to protrude more or less deeply into secondary runner 2, depending on the position of control element 5. Suitably, a sealing tape of a heat-resistant elastomer material is placed in groove 6 in the wall of the block 100. Slide 3 is divided into several sections 3', 3" etc. (FIG. 2) which are spaced in the control direction and abut against one another, but can be shifted independently of one another by separate control elements 5', 5", etc. The individual sections 3', 3" can be sealed off from each other by sealing tapes 6'. The runners 1 and 2 are fed by extruders 50' and 50".

Preferably, none of the sections of the multipart slide constitutes more than half of the overall width. As a rule, the slide preferably consists of more than three sections, which preferably are all about equally wide. To effect a very fine control of the thickness of the secondary extrudate, it may be useful to subdivide the slide into, for example, 5 to 20 lamellar sections, each only a few millimeters wide. The number of the sections is limited only to the extent that it is moved by its own control element since, even if offset, there is a limit to which the controlled slide elements can be placed close to one another. On the other hand, the more densely packed the independently controlled slide elements are placed, the greater the ability to even out fluctuations in thickness in narrowly defined areas of the extrudate.

Figures 3A, 3B:
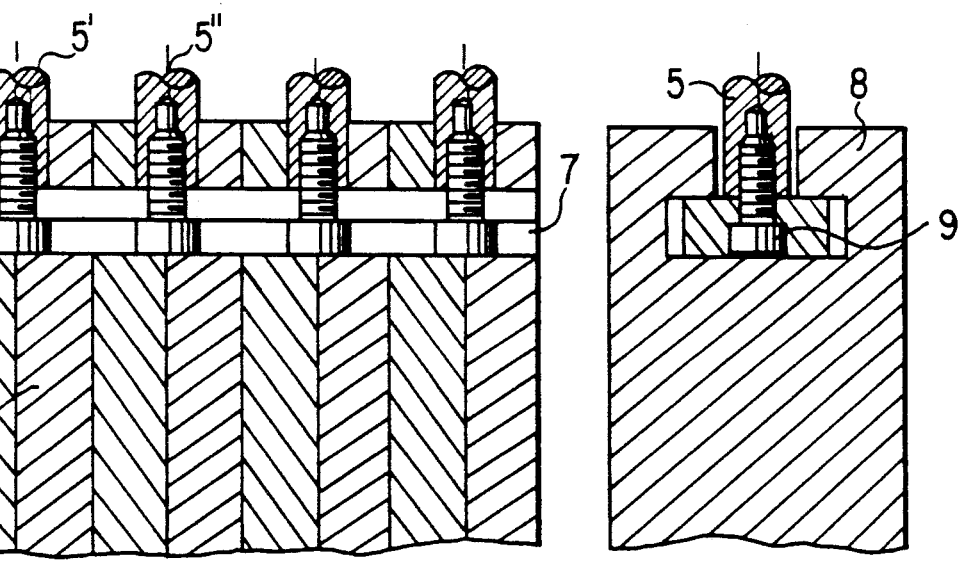
FIGS. 3A and 3B show another embodiment of the sections of the slide and control elements in longitudinal and transverse cross section, respectively.

Nonetheless, it is not necessary that each section be acted on by its own control element. As shown in FIGS. 3A and 3B, a larger number of lamellar sections 3', and 3" can be affected by a lesser number of control elements 5', 5" if the controlling force acts on each of a group of several sections via an elastic strip extending between the control elements, and thus the sections can be only partially adjusted independently from one another by the separate control elements. In this way a rather uniformly curved profile of the slide can be provided, which is useful, for example, if an unevenness of the thickness distribution runs from the middle to the edge and is to be evened out over a correspondingly wide area. So that the sections also follow a lifting motion of the control element, their heads 8 should encompass the strip 7 and the lower ends of the control means should be connected with strip 7 in a tension proof manner, for example by screws 9.

In the coextrusion adapter, the main runner can have for example a thickness of 2 to 20 mm and a width of 30 to 100 mm. The secondary runner or runners are preferably, but not necessarily, thinner than the main runner. In the extrusion die 200 a multilayered web, for example a slab or sheet web 0.1 to 12 mm thick and 500 to 3000 mm wide is formed from the combined extrudate, and the web can consist of individual layers from 0.01 to 12 mm thick. In a preferred embodiment the extruded web consists of a main or core layer, which is formed from the main extrudate and contains 80 to 99.9% by weight of the material running through at any given time, and at least one, preferably two covering layers adhering to it, which contain the remaining part of the material and which are formed from the secondary extrudate or extrudates. In the core layer there can be formed hollow spaces extending lengthwise along the extruded web and formed by core pieces which are placed in the outlet slit of the extrusion die. These hollow spaces can optionally be separated from one another by narrow webs. The extruded web may be cooled and optionally smoothed in unit 500.

As control element 5, devices are suitable which are also used in known coextrusion adapters to adjust the slide. For large regulating distances, screw bolts are suitable and the head of these screw bolts which protrudes from the coextrusion adapter can be turned by a control wheel or a control wrench. For technical operation, a control servo robot that can be shifted from one control element to the other or servomotors 410 permanently installed on each control element are also suitable. Also, hydraulic pistons can be used as steerable control elements. For fine adjustment during automatic regulating, electrically heated thermal expansion pins and piezotranslators are suitable.

Figure 4:
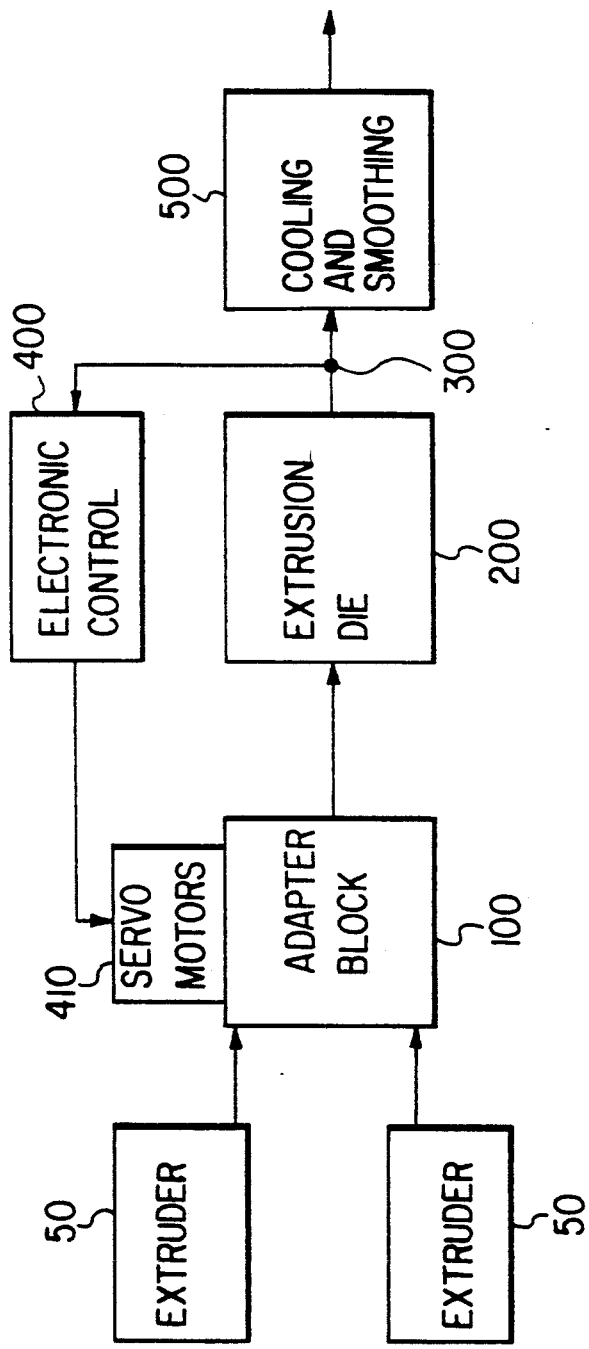
FIG. 4 is a block diagram of an extrudate production system according to the present invention.

With such an arrangement, a control of the thickness of the extruded web or of individual coextruded layers is possible. For this purpose the thickness of the layer to be controlled is measured at several places by sensors 300 distributed over the width of the web and each of the appropriate sections of the slide corresponding to the width position of the measured thickness is automatically adjusted by a respective control element 3 that can, for example, be electronically triggered via an electronic control unit 400 which controls the servomotors 410. For measuring the thickness, several immovably placed sensors 300 or a sensor that can be automatically shifted over the width of the web (not shown) can be used. Although FIG. 4 shows the sensors as being placed between the extrusion die and the cooling and smoothing unit 500, it may be appreciated that the positioning of the sensors 300 at other locations downstream from the extrusion die 200 would be equally effective, e.g., they could be placed downstream from the cooling and smoothing unit 500. By use of the invention it is possible to produce an extruded web with very narrow tolerances in the thickness of the individual layers.

Each control element can be assigned a range of action in the width of the extruded web by means of trial adjustments. For the selective thickness measurement of individual layers of a coextruded web there may be used known sensors relying on spectrophotometric or radiometric methods which are based on the different absorption behavior of the thermoplastically processed plastics involved. The actual values thus determined can be compared with the desired values and the difference can be converted into a corresponding adjustment variable for the appropriate control means in control unit 400, which may be a microprocessor or computer.

It is understood that coextruded webs in the sense of the invention can be produced from any number of layers with thicknesses that can be selected and controlled in any manner. For this purpose coextrusion adapters are used in which several secondary extrudates are laid onto the main extrudate one after another, and each secondary extrudate can be individually controlled in the sense of the invention. Likewise one or more secondary extrudates can be laid on to both sides of the main extrudate. Even the main extrudate itself can be controlled in the same way if necessary.

The technique of coextrusion is known in the art. It presupposes that the molding compounds of the main and secondary extrudate can be thermoplastically processed at the same temperatures without decomposing and without having a harmful effect on one another.

If the molding compounds in the main components are substantially the same and only differ in the presence or absence of dyes or other additives, then as a rule a coextruded web results in which the layers firmly adhere to one another. The same is true if the extrudates consist of different but compatible molding compounds. In the case of low compatibility it can happen that the layers adhere to one another only weakly and the covering layer can optionally be pulled away from the core layer. It can thus act as a temporary covering layer.

What is claimed as new and desired to be secured by Letters Patent of the United States is:

1. A system for producing a multi-layer extrudate of thermoplastically processable plastic, comprising:
   an extrusion adapted block having a main runner through which an extrudate may flow in a flow direction and at least one secondary runner connected to said main runner and through which another extrudate may flow for merger with the extrudate in said main runner to form a multi-layer extrudate;
   means in said adapter block for regulating the thickness of any extrudate flowing through each said at least one secondary runner, comprising a multipart slide comprising a plurality of side-by-side slide sections mutually spaced in a direction transverse to the flow direction and slidably fitted in said adapter block for movement to adjustably protrude into said secondary runner;
   control means for separately controlling movement of at least some of said slide sections, comprising at least two independently movable control elements connected to said slide sections;
   a die through which the multi-layer extrudate is extruded said die being wider than said adapter block;
   means for selectively measuring the thickness of individual layers of the extruded multi-layer extrudate at a plurality of places distributed over the width thereof; and means for driving said control elements as a function of the thicknesses measured by said measuring means at width positions assignable by means of trial adjustments to correspond to respective ones of said control elements, whereby the thicknesses of the layers of the extruded multi-layer extrudate can be controlled during the running operation of the system.

2. The system of claim 1 wherein none of said slide sections has a width greater than one half of the width said multi-part slide.

3. The system of claim 1 wherein said multi-part slide comprises more than three slide sections.

4. The system of claim 1 wherein said slide sections all have equal widths.

5. The system of claim 1 wherein said thickness measuring means comprise a plurality of fixed sensors distributed over the width of the extruded multi-layer extrudate.

6. The system of claim 1 excluding extruders for feeding extrudate to said adaptor block.

7. The system of claim 1 including means for cooling the extruded multi-layer extrudate.

8. The system of claim 7 including means for smoothing the extruded multi-layer extrudates.

9. A process for producing a multi-layer extrudate of thermoplastically processable plastic, comprising the steps of:

feeding at least two melted thermoformable plastic extrudates to respective runners of an extrusion adapter where said extrudates are merged to form a multi-layer extrudate;

extruding said multi-layer extrudate through a die wider than the extrusion adapted to form an extruded multi-layer extrudate;

sensing a thickness of at least one layer of said extruded multi-layer extrudate at a plurality of positions along the width of said extruded multi-layer extrudate during said extruding step;

providing at least one multi-part slide in said extrusion adapter, said multi-part slide comprising a plurality of side-by-side slide sections mutually spaced along the width of the extrusion adaptor and slidably fitted in the extrusion adaptor for movement to adjustably protrude into a respective one of said runners for adjusting the thickness of the extrudate in said respective one of said runners;

performing trial adjustments of said multi-part slide so as to assign a range of action in the width of the extruded web for each of said slide sections; and controlling positions of said slide sections during said extruding step as a function of the sensed thickness of said at least one layer at the assigned width positions corresponding to width positions of said slide sections.

10. The process of claim 9 including the steps of cooling and smoothing said extruded multi-layer extrudate.

* * * * *